(12) United States Patent
Galindo-Legaria et al.

(10) Patent No.: US 7,464,071 B2
(45) Date of Patent: Dec. 9, 2008

(54) SYSTEM AND METHOD FOR FORCING A QUERY EXECUTION PLAN

(75) Inventors: Cesar Galindo-Legaria, Redmond, WA (US); Ganapathy Krishnamoorthy, Issaquah, WA (US); Eric N. Hanson, Bellevue, WA (US); Wei Yu, Issaquah, WA (US); Milind Joshi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 11/117,586

(22) Filed: Apr. 28, 2005

(65) Prior Publication Data

US 2006/0248046 A1 Nov. 2, 2006

(51) Int. Cl.
*G06F 7/00* (2006.01)
(52) U.S. Cl. .............................................. 707/2; 707/3
(58) Field of Classification Search ...................... 707/2, 707/3
See application file for complete search history.

(56) References Cited

U.S. PATENT DOCUMENTS

| 7,167,859 | B2* | 1/2007 | Shah et al. ..................... 707/9 |
|---|---|---|---|
| 2002/0055932 | A1* | 5/2002 | Wheeler et al. ........... 707/104.1 |
| 2003/0009446 | A1* | 1/2003 | Agarwal et al. ................. 707/2 |
| 2003/0093410 | A1* | 5/2003 | Couch et al. ................... 707/3 |
| 2003/0182276 | A1* | 9/2003 | Bossman et al. ............... 707/3 |
| 2004/0019587 | A1* | 1/2004 | Fuh et al. ....................... 707/2 |
| 2006/0031189 | A1* | 2/2006 | Muras et al. ................... 707/2 |

OTHER PUBLICATIONS

Mihnea Andrei, Patrik Valduriez, User-Optimizer Communication using Abstract Plans in Sybase ASE, 2001, 27th VLDB Converence; Sections 1-5.*

* cited by examiner

*Primary Examiner*—Hosain T Alam
*Assistant Examiner*—Amy Ng
(74) *Attorney, Agent, or Firm*—Woodcock Washburn LLP

(57) ABSTRACT

A suggested query execution plan is used as a constraint on a guided optimization process such that all execution plans that do not conform to the suggested execution plan are eliminated as possible alternatives. If the guided optimization process successfully generates a resulting execution plan, then the result will conform to the suggested execution plan. If the guided optimization process fails to generate a resulting execution plan, then it may be determined that the suggested execution plan is invalid.

16 Claims, 6 Drawing Sheets

Hint Tree 300

SYSTEM AND METHOD FOR FORCING A QUERY EXECUTION PLAN

FIELD OF THE INVENTION

The present invention relates to the field of query optimization, and, more specifically, to performing a guided query optimization to force a suggested query execution plan.

BACKGROUND OF THE INVENTION

A query optimizer is a component within a database system that receives an incoming query and produces an execution plan for executing the query in an efficient manner. The incoming query is generally written in a declarative high-level language such as, for example, structured query language (SQL). The resulting execution plan is forwarded to the query processor for execution of the query. The optimizer may produce the execution plan by examining the physical access structures (e.g. existing table structures and indices of the database schema) as well as the distribution of data within the database. When the data or the access structures change, a pre-existing query can be re-optimized to produce a new and efficient execution plan that takes into account these changes without the need for application developers to rewrite the query.

An optimizer may use statistical models to estimate the volume of data that will be processed in each step of an execution plan. These models are accurate most of the time, but they have limitations that lead to errors in estimation, particularly in the case of complex queries. For example, the models may sometimes be generated based on statistics that are inaccurate and/or incomplete. Additionally, there may be one or more expressions within a query for which the optimizer is incapable of estimating the selectivity, which is the comparative quantity of data (e.g. percentage of rows) that will be returned for a given condition. The difficulty of estimating selectivity is generally dependent, at least in part, on the complexity of a condition within the query. These errors in turn lead to the selection of sub-optimal execution plans, which may take much longer to execute in comparison with other valid execution plans.

In addition to statistical limitations, another issue related to optimization is that, with respect to query execution, users of database system are often risk averse, meaning that they place a priority on stability. In particular, execution plans do not always perform as they are predicted, and users may be willing to sacrifice a slight improvement in the efficiency of an execution plan for an assurance that an execution plan will work adequately and will not cause major problems. For example, consider a scenario in which a query is first executed according to a first execution plan that works adequately to provide a full set of results in a timely manner. Now suppose that the same query is later re-submitted to the database and the optimization process is performed a second time. During this second optimization, a second query plan is generated that is estimated to be slightly more efficient than the first execution plan. Although this second query plan may, in fact, be more efficient than the first, the user may actually prefer for the query to be re-executed according to the first execution plan. This is because it has already been demonstrated that the first execution plan has worked effectively, and the user is willing to trade off the expected improvement in efficiency of the second plan for the proven results of the first plan.

To reduce the effects of the statistical errors and improve the stability of the optimization process, some conventional database systems employ an optimization methodology that is commonly referred to as "plan persistence." This methodology enables an execution plan to be persisted or stored upon execution of a corresponding query. If the execution plan is successful, then it can be retrieved from memory and re-used at a later time whenever the same or a similar query is submitted to the database.

While plan persistence provides some advantages over repeating the optimization process from scratch, there are also a number of drawbacks associated with it. In particular, plan persistence does not enable a persisted plan to be validated prior to a repeat usage. This is problematic because there are a number of scenarios in which a persisted plan may become invalid between the time that it is first used and the time that it is later re-used. For example, database schemas are constantly being updated to accommodate changing data. Accordingly, it is quite possible that, while a query plan is stored or persisted, the corresponding database schema may change. For example, a data index and/or data table column may be deleted from the schema. Such changes may result in the invalidation of a plan during the time period that it is persisted. Additionally, while a plan is persisted, it may be tampered with by hackers, other unauthorized users, viruses and other security flaws, or even authorized users who access and tamper with the plan in error. This is particularly problematic when a plan is transferred over the Internet via electronic mail or is otherwise shared or distributed among various users. Furthermore, even if a persisted plan remains valid until it is retrieved for repeat usage, there are a number of scenarios in which the user may wish to edit an otherwise valid plan prior to its repeated use. For example, through experimenting or through analyzing the results of other similar queries, a user may determine that a persisted plan may be rendered more efficient through one or more local modifications or "tweaks." Additionally, a user and/or administrator may have some specialized knowledge of an event such as, for example, a database schema change or security violation that would require a persisted plan to be edited.

Accordingly, there is a need in the art for an improved approach to the optimization process that reduces its statistical limitations and improves stability, while also avoiding the repeat use of invalid execution plans and providing flexibility and extensibility to edit execution plans prior to their repeat use. An improved approach to the optimization process with these and other advantages is set forth below.

SUMMARY OF THE INVENTION

The present invention is directed to systems and methods for forcing a query execution plan. According to an embodiment of the invention, when an incoming query is submitted to a database server, a suggested execution plan is also provided along with the query. The suggested execution plan may be provided in the form of a "hint", which is a textual representation of the suggested execution plan. The database server may use the suggested execution plan as a constraint on the optimization process such that all execution plans that do not conform to the suggested execution plan are eliminated as possible alternatives. Accordingly, if this "guided" optimization process successfully generates a resulting execution plan, then the result will match the suggested execution plan. Additionally, if the guided optimization process fails to generate a resulting execution plan, then it may be determined that the suggested execution plan is invalid. Thus, the guided optimization serves as a validation of the suggested execution plan and greatly reduces the possibility that an invalid execution plan will be submitted to the execution engine.

According to an aspect of the invention, the suggested execution plan may be generated by a previous query optimization performed upon a previous query that is related in some way to the present query. The suggested execution plan may be associated with the present query through reference to a lookup table. The suggested execution plan may be subsequently edited or changed after it has been associated with the present query. The suggested execution plan may also be a newly generated execution plan that is created by a user for use with the present query.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
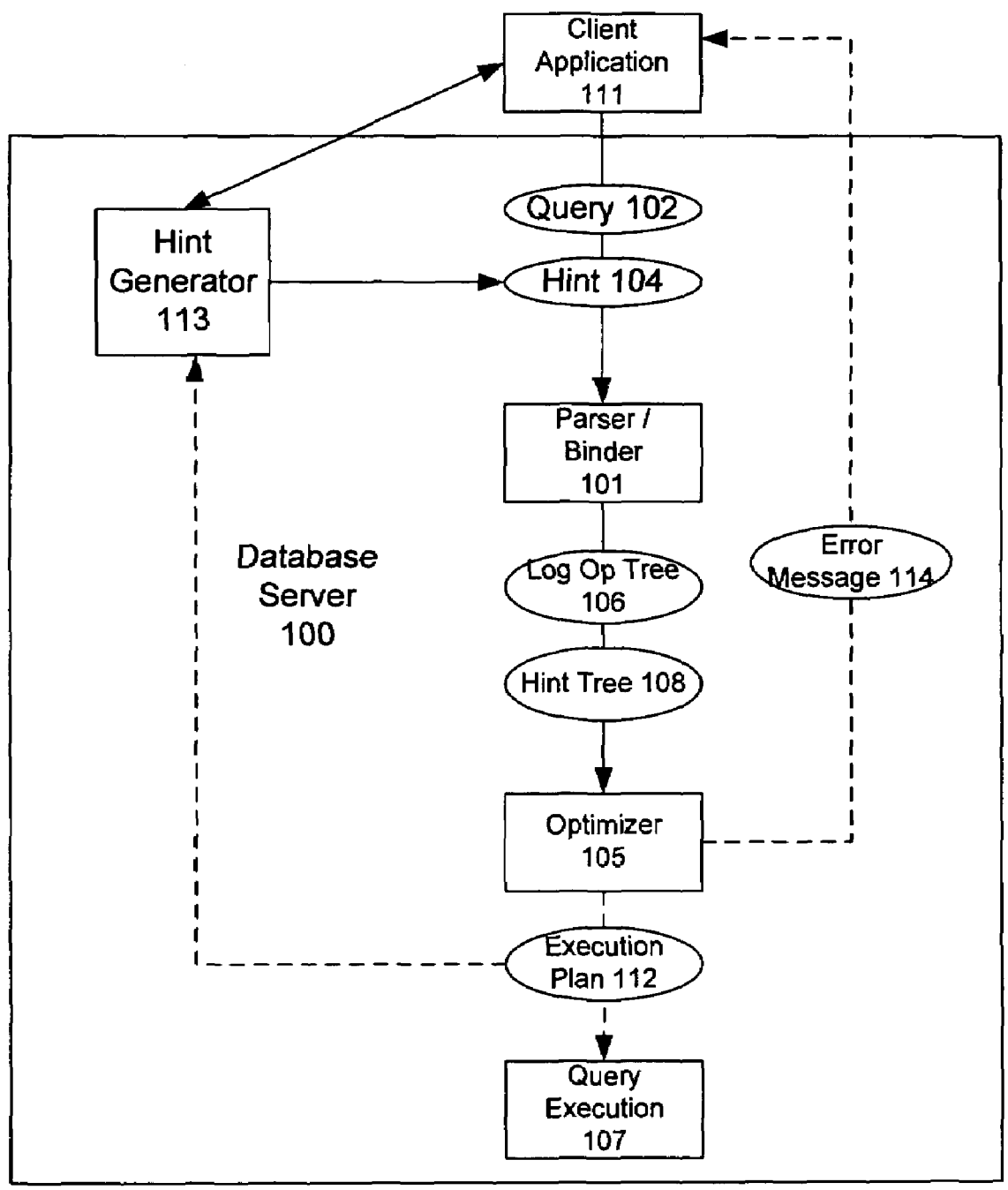
FIG. 1 depicts an exemplary database system in accordance with the present invention.

An exemplary database system in accordance with the present invention is shown in FIG. 1. As shown, client application 111 submits a query 102 to database server 100. A hint 104 is provided along with the query 102. The hint 104 is a textual representation of a suggested plan with which to execute query 102. Hint 104 may be encoded in a language such as, for example, extensible markup language (XML). More specifically, hint 104 may be encoded in XML Showplan format. Some database servers such as, for example, SQL Server from MICROSOFT Corp. of Redmond, Wash., use the XML Showplan as a format with which to present execution plans to users and tools. Accordingly, use of the Showplan format enables an execution plan to be generated and used with a previous query, output by the database server 100, and then subsequently associated with a later query 102 and fed back to database server 100 with the later query 102. Other languages and formats may also make this execution plan feedback possible and may also be used in accordance with the present invention. Also, as an alternative to hint 104, non-textual (e.g. structural) representations of the suggested execution plan may also be submitted to database server 100 along with query 102.

In some circumstances, hint 104 may be generated by a user at client application 111. Alternatively, hint 104 may be generated by a hint generator 113. Hint generator 113 has access to a number of previous execution plans that were generated through the optimization of previous queries. As shown in FIG. 1 by the dashed line from query plan 112 to hint generator 113, after an optimization is performed, the resulting execution plan 112 may be submitted to hint generator 113 for storage. Hint generator 113 is capable of associating a present query 102 with one or more previous stored execution plans. Hint generator 113 may perform this association by referencing the present query 102 with one or more lookup tables that index the stored previous execution plans.

When a query 102 is ready for execution, client application 111 may submit the query 102 to the hint generator 113 for generation of a corresponding hint 104. Upon generating the hint 104, hint generator 113 may submit the hint 104 directly to parser 101. Alternatively, hint generator 113 may return the hint 104 back to the client application 101 to enable a user to view, approve or disapprove, and possibly edit the hint 104 prior to its submission to parser 101. A user may choose to edit the hint 104, for example, based on the user's own experimentations and findings that editing the hint 104 would make the hint 104 more efficient for the current query 102. Thus, the present invention may provide flexibility and extensibility for a user to modify and fine tune previously generated execution plans for improved performance. Additionally, hint 104 may be generated entirely by a user or third party without the assistance of a hint generator 113. This user generated approach may be preferable if, for example, the user has acquired extensive experience and familiarity with the subject matter of query 102.

Once the query 102 and the hint 104 are provided to the database 100, they are received by parser/binder 101, which parses and validates query 102 and hint 104. Because the hint 104 may be written in XML and the query 102 may be written in SQL, different parsing and validation procedures may be employed for query 102 and for hint 104. Parser/binder 101 also transforms query 102 into a logical log-op tree 106 that includes relational algebraic expressions for query 102. Additionally, parser/binder 101 transforms the hint 104 into a hint tree 108, which is a structural representation of the suggested query plan that is textually represented by hint 104. The log-op tree 106 and hint tree 108 are then submitted to optimizer 105. The log-op tree 106 and hint tree 108 may be simplified prior to submitting them to the optimizer 105.

Optimizer 105 in accordance with the present invention uses the hint tree 108 and the log-op tree 106 to perform a guided query optimization. Generally, the hint tree 108 serves as a constraint on the optimization process such that all execution plans that do not conform to the hint 104 are eliminated as possible alternatives. Accordingly, if the guided optimization process successfully generates a resulting execution plan 112, then the result will match the hint 104. Additionally, if the guided optimization process fails to generate a resulting execution plan 112, then it may be determined that the hint 104 is invalid. Thus, the guided optimization serves as a validation of the hint 104 and eliminates the possibility that an invalid hint will cause an invalid execution plan to be submitted to the execution engine. If the optimization process fails to generate a result that matches the hint 104, then an error message 114 may be returned to client application 111.

Figure 2:
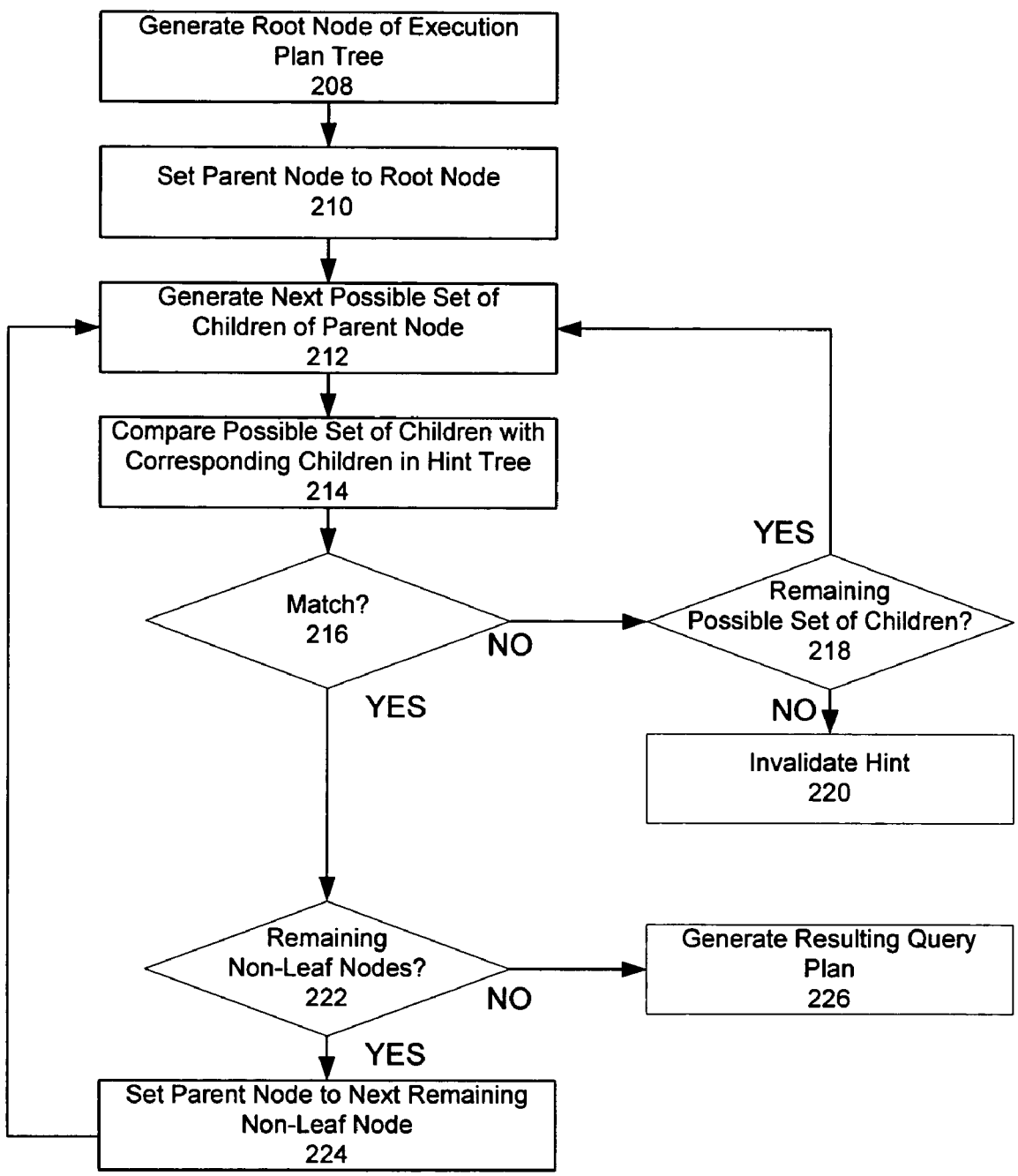
FIG. 2 is a flowchart of an exemplary method for performing a guided query optimization in accordance with the present invention.

The guided optimization may be performed by allowing optimizer 105 to proceed through its standard path of generation and validation of alternatives and to use the hint tree 108 as a constraint on each generated alternative. Running the standard query optimizer code path preserves the plan correctness guarantees of the conventional optimization process. A flowchart of an exemplary method for performing a guided query optimization in accordance with the present invention is shown in FIG. 2. At act 208, optimizer 105 generates a root node of a new execution plan tree which is used to form the resulting execution plan 112. The root node of the execution plan tree must match the root node of hint tree 108. For example, if the root node of hint tree 108 includes a join operation, then the root node of the execution plan tree must also include a join operation. At act 210, optimizer 105 sets a "parent node" of the execution plan tree to be the root node. At act 212, optimizer 105 generates a possible set of children for the "parent node" of the execution plan tree. Optimizer 105 generates this possible set of children in accordance with its standard path of generation and validation of alternatives based on the information in log-op tree 106. At act 214, optimizer 105 compares the possible set of children generated at act 104 with a corresponding set of children in hint tree 108. At act 216, optimizer 105 determines whether the possible set of children match the corresponding set of children in hint tree 108. If so, then, at act 222, optimizer 105 determines whether there are any remaining non-leaf nodes in the execution plan tree. If so, then, at act 224, optimizer 105 sets the "parent node" to be a next remaining non-leaf node. Optimizer 105 then, at act 212, generates a new possible set of children for the newly designated "parent node". If there are no remaining non-leaf nodes in the execution plan tree, then, at act 226, optimizer 105 may generate the resulting execution plan 112 from the execution plan tree in its current form.

If, at act 216, optimizer 105 determines that the current possible set of children do not match the corresponding set of children in hint tree 108, then, at act 218, it is determined whether another possible set of children can be generated for the "parent node". If so, then, at act 212, optimizer 105 generates a new possible set of children for the "parent node". If optimizer 105 cannot generate any more possible sets of child nodes, then, at act 220, it may be determined that the hint 104 is invalid.

Figure 3:
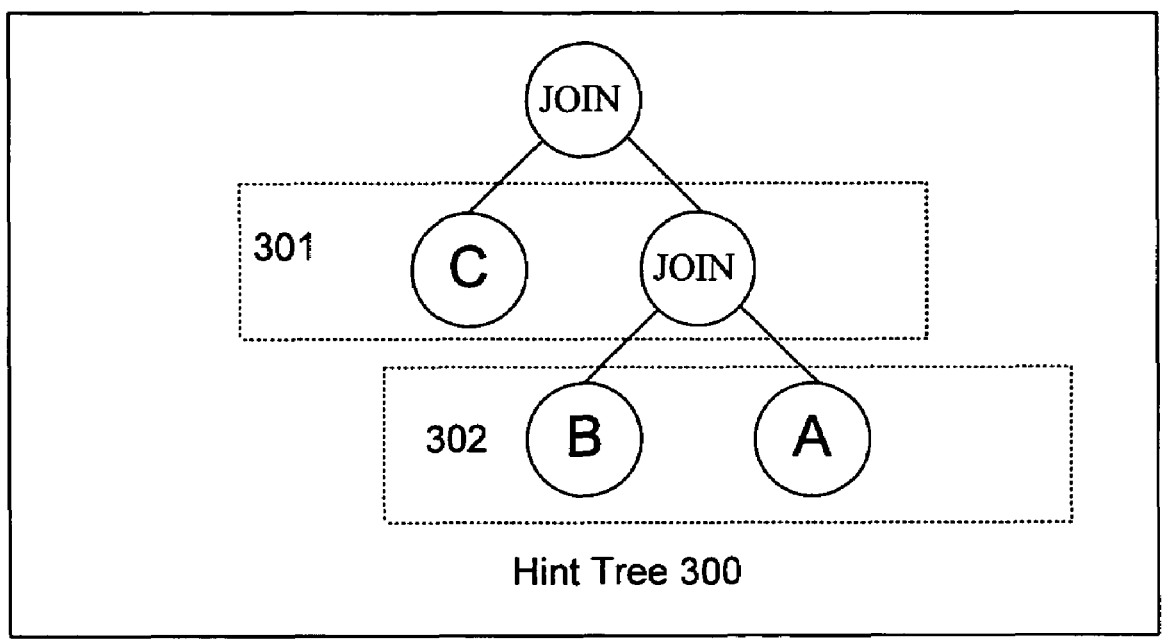
FIG. 3 depicts an exemplary hint tree in accordance with the present invention.
Figure 4:
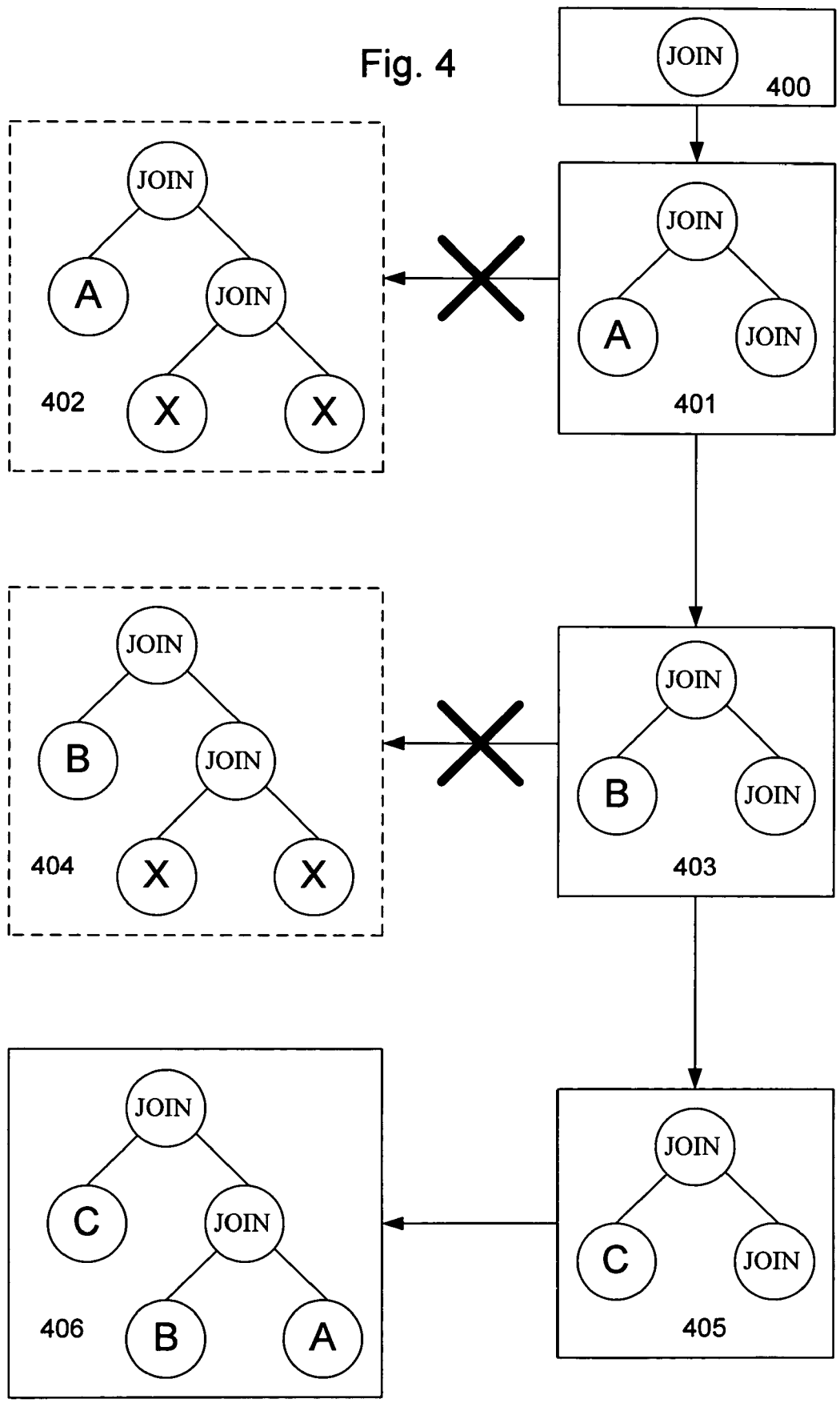
FIG. 4 depicts an exemplary generation of a forced execution plan in accordance with the present invention.

An example of the method depicted in FIG. 2 will now be illustrated with respect to FIGS. 3 and 4. FIG. 3 depicts an exemplary hint tree 300 in accordance with the present invention. Exemplary hint tree 300 includes a root node, a first level set of children 301, and a second level set of grand-children 302. FIG. 4 depicts how an execution plan 112 may be generated in accordance with the method of FIG. 2 using exemplary hint tree 300 as a constraint. At act 208, which corresponds to act 400 of FIG. 4, a root node for the execution plan tree is generated. The root node of the execution plan tree includes a join operation which matches the join operation in the root node of hint tree 300. At act 210, the "parent node" of the execution plan tree will be set to the root node with the join operation depicted at act 401.

At the first iteration of act 212, which corresponds to act 401 of FIG. 4, a first set of possible children is generated. The first set of possible children depicted at act 401 includes element "A" and another second level join operation. This first set of possible children is generated in accordance with the standard path of generation and validation of alternatives based on the information in log-op tree 106. At the first iteration of act 214, optimizer 105 compares the first set of possible children depicted at act 401 with the corresponding set of children 301 in hint tree 300. At the first iteration of act 216, optimizer 105 determines that the first set of possible children do not match the corresponding set of children 301 in hint tree 300. At act 218, it is then determined that another possible set of children can, in fact, be generated.

At the second iteration of act 212, which corresponds to act 403 of FIG. 4, a second set of possible children is generated. The second set of possible children depicted at act 403 includes element "B" and another second level join operation. This second set of possible children is generated in accordance with the standard path of generation and validation of alternatives based on the information in log-op tree 106. At the second iteration of act 214, optimizer 105 compares the second set of possible children depicted at act 401 with the corresponding set of children 301 in hint tree 300. At the second iteration of act 216, optimizer 105 determines that the second set of possible children do not match the corresponding set of children 301 in hint tree 300. At act 218, it is then determined that another possible set of children can, in fact, be generated.

At the third iteration of act 212, which corresponds to act 405 of FIG. 4, a third set of possible children is generated. The third set of possible children depicted at act 405 includes element "C" and another third level join operation. This third set of possible children is generated in accordance with the standard path of generation and validation of alternatives based on the information in log-op tree 106. At the third iteration of act 214, optimizer 105 compares the third set of possible children depicted at act 401 with the corresponding set of children 301 in hint tree 300. At the third iteration of act 216, optimizer 105 determines that, this time, the third set of possible children matches the corresponding set of children 301 in hint tree 300.

At act 222, it is then determined that the second level join operation is a remaining non-leaf node. At act 224, the "parent node" is set to be the second level join operation. At the fourth iteration of act 212, which corresponds to act 406 of FIG. 4, a first set of possible children for the second level join operation is generated. The new first set of possible children depicted at act 406 includes elements "A" and "B". This new first set of possible children is generated in accordance with the standard path of generation and validation of alternatives based on the information in log-op tree 106. At the fourth iteration of act 214, optimizer 105 compares the fourth set of possible children depicted at act 401 with the corresponding set of children 302 in hint tree 300. At the fourth iteration of act 216, optimizer 105 determines that the new first set of possible children matches the corresponding set of children 302 in hint tree 300.

At act 222, it is then determined that there are no remaining non-leaf nodes within the execution plan tree depicted in act 406. Thus, at act 226, the resulting execution plan 112 is generated in accordance with the execution plan tree depicted at act 406. This execution plan tree matches the hint tree 300 and, by progressing through the guided optimization process, has validated the hint 104. In addition to depicting the validation of hint 104, FIG. 4 also depicts how the guided optimization process of FIG. 2 may reduce the time and bandwidth required to generate the resulting execution plan 112. In particular, once optimizer 105 determines that a possible set of children do not match a corresponding set of children in the hint tree 300, optimizer 105 may cease to generate any further set of alternatives for the matching set of possible children. Thus, by "pruning" the generation of alternatives at acts 401 and 403, optimizer 105 need not perform the unnecessary generation of possible children depicted at acts 401 and 404. This "pruning" of non-matching alternatives is depicted by the "X" symbols of and the dashed lines of FIG. 4, which indicate that acts 402 and 404 are not performed. As should be appreciated, for a "parent node" with a very large quantity of possible children, this "pruning" of non-matching alternatives may result in an even more significant savings of time and bandwidth.

Accordingly, as set forth above with reference to FIGS. 1-4, the present invention provides systems and methods for forcing a query execution plan. As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with processes for persisting objects in a database store in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the object persistence methods of the present invention.

Figure 5:
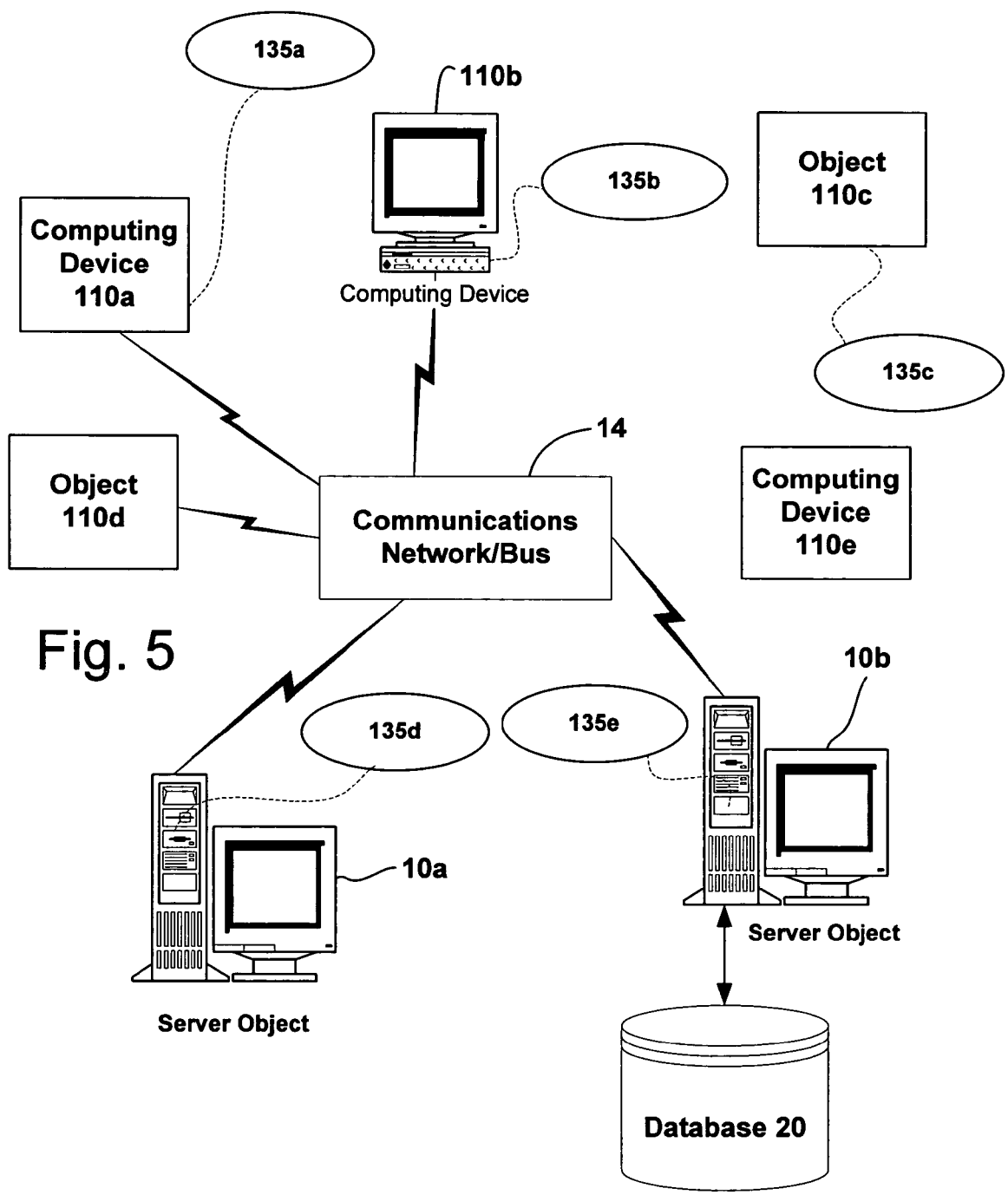
FIG. 5 is a block diagram representing an exemplary network environment having a variety of computing devices in which the present invention may be implemented.

FIG. 5 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices that provide services to the system of FIG. 5, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the object persistence methods of the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 5, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the object persistence techniques of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the persistence mechanism of the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 5 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to maintain a persisted object.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

FIG. 5 and the following discussion are intended to provide a brief general description of a suitable computing device in connection with which the invention may be implemented. For example, any of the client and server computers or devices illustrated in FIG. 5 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

Figure 6:
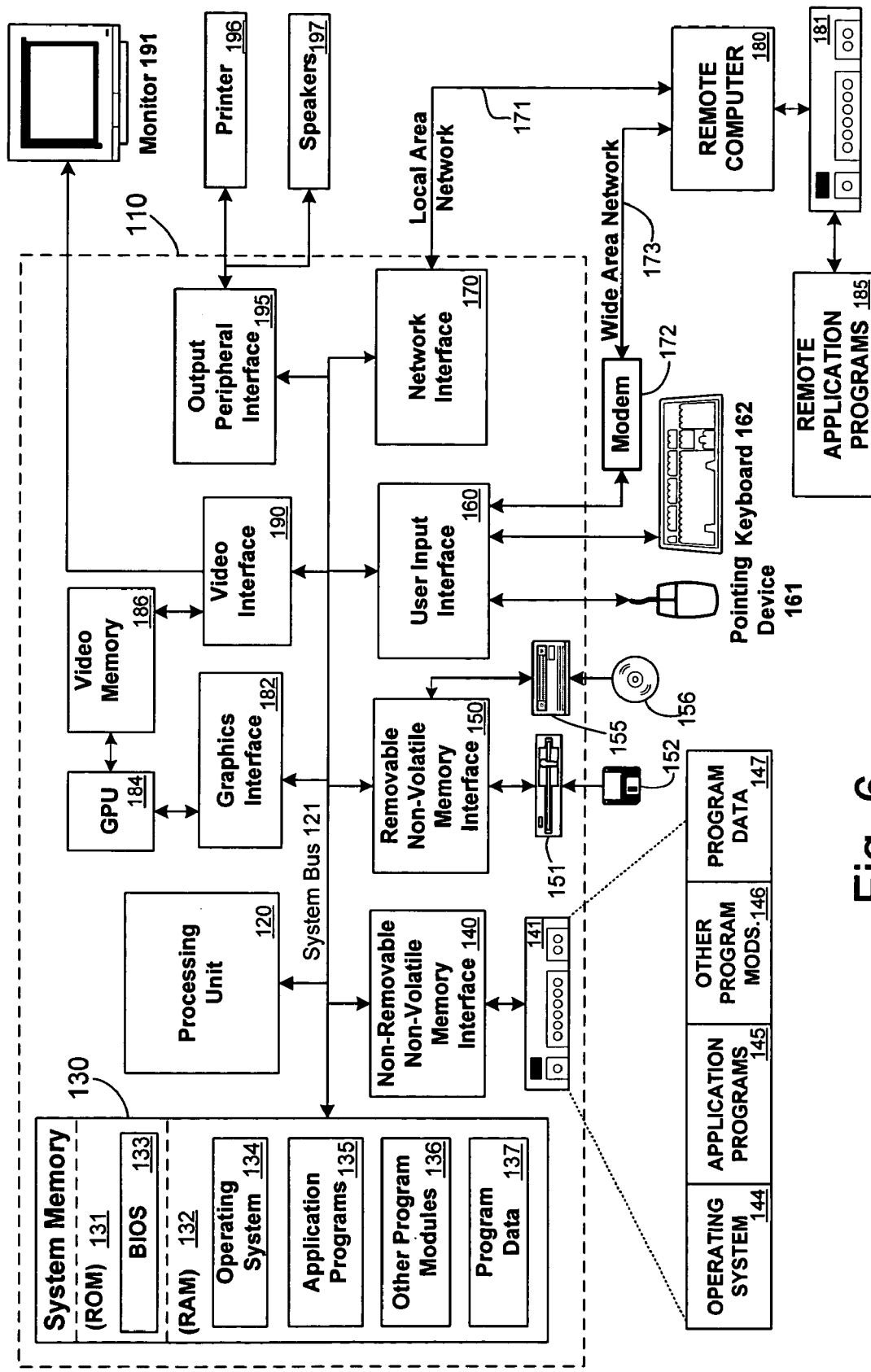
FIG. 6 is a block diagram of an exemplary representing an exemplary computing device in which the present invention may be implemented.

FIG. 6 thus illustrates an example of a suitable computing system environment 600 in which the invention may be implemented, although as made clear above, the computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

With reference to FIG. 6, an exemplary system for implementing the invention includes a general purpose computing device in the form of a computer 110. Components of computer 1 10 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6 provide storage of computer readable instructions, data structures, program modules and other data for the computer 110. In FIG. 6, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

CONCLUSION

Thus, systems and methods for forcing a query execution plan have been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for forcing a query execution plan, the method comprising:
    receiving a suggested execution plan;
    generating a hint tree that is a structural representation of the suggested execution plan;
    generating a plurality of execution plans; and
    performing a guided query optimization in which execution plans that do not match the suggested execution plan are eliminated as candidates such that the guided query optimization generates a resulting execution plan that matches the suggested execution plan or a determination that the suggested execution plan is invalid, guided query optimization comprising
    (a) setting a parent node to be a root node of an execution plan tree;
    (b) generating a possible set of child nodes of the parent node;
    (c) comparing the possible set of child nodes to a corresponding set of child nodes in the hint tree, and
    (d) if the possible set of child nodes does not match the corresponding set of child nodes in the hint tree, then:
        if there is another possible set of child nodes, then returning to step (b);
        if there is no other possible set of child nodes, then determining that the hint tree is invalid;
    (e) if the set of possible child nodes matches the corresponding set of child nodes in the hint tree, then:
        if there is a remaining non-leaf node in the execution plan tree, then setting the parent node to be the remaining non-leaf node and returning to step (b); and
        if there is no remaining non-leaf node in the execution plan tree, then generating the resulting execution plan in accordance with the execution plan tree in its current form.

2. The method of claim 1, comprising receiving a textual representation of the suggested execution plan that is encoded in extensible markup language showplan format.

3. The method of claim 1, comprising receiving the suggested execution plan that was generated by a previous query optimization.

4. The method of claim 3, comprising receiving the suggested execution plan that was generated by the previous query optimization and then subsequently edited.

5. The method of claim 1, further comprising associating the suggested execution plan to the query through reference to a lookup table.

6. A computer readable storage medium storing computer executable instructions for performing the following steps comprising:
    receiving a suggested execution plan;
    generating a hint tree that is a structural representation of the suggested execution plan;
    generating a plurality of execution plans; and
    performing a guided query optimization in which execution plans that do not match the suggested execution plan are eliminated as candidates such that the guided query optimization generates a resulting execution plan that matches the suggested execution plan or a determination that the suggested execution plan is invalid, guided query optimization comprising
    (a) setting a parent node to be a root node of an execution plan tree;
    (b) generating a possible set of child nodes of the parent node;
    (c) comparing the possible set of child nodes to a corresponding set of child nodes in the hint tree, and
    (d) if the possible set of child nodes does not match the corresponding set of child nodes in the hint tree, then:
        if there is another possible set of child nodes, then returning to step (b);
        if there is no other possible set of child nodes, then determining that the hint tree is invalid;
    (e) if the set of possible child nodes matches the corresponding set of child nodes in the hint tree, then:
        if there is a remaining non-leaf node in the execution plan tree, then setting the parent node to be the remaining non-leaf node and returning to step (b); and
        if there is no remaining non-leaf node in the execution plan tree, then generating the resulting execution plan in accordance with the execution plan tree in its current form.

7. The computer readable storage medium of claim 6, wherein the suggested execution plan is encoded in extensible markup language showplan format.

8. The computer readable storage medium of claim 6, wherein the suggested execution plan is generated by a previous query optimization.

9. The computer readable storage medium of claim 6, wherein the suggested execution plan is generated by the previous query optimization and then subsequently edited.

10. The computer readable storage medium of claim 6, further comprising computer executable instructions for associating the suggested execution plan to the query through reference to a lookup table.

11. A system for forcing a query execution plan, the system comprising
    a processor operative to execute computer executable instructions, and memory having stored therein computer executable instructions for performing the following steps:
    receiving a suggested execution plan;
    generating a hint tree that is a structural representation of the suggested execution plan;
    generating a plurality of execution plans; and
    performing a guided query optimization in which execution plans that do not match the suggested execution plan are eliminated as candidates such that the guided query optimization generates a resulting execution plan that matches the suggested execution plan or a determination that the suggested execution plan is invalid, guided query optimization comprising
    (a) setting a parent node to be a root node of an execution plan tree;
    (b) generating a possible set of child nodes of the parent node;
    (c) comparing the possible set of child nodes to a corresponding set of child nodes in the hint tree, and (d) if the possible set of child nodes does not match the corresponding set of child nodes in the hint tree, then:
  if there is another possible set of child nodes, then returning to step (b);
  if there is no other possible set of child nodes, then determining that the hint tree is invalid;
(e) if the set of possible child nodes matches the corresponding set of child nodes in the hint tree, then:
  if there is a remaining non-leaf node in the execution plan tree, then setting the parent node to be the remaining non-leaf node and returning to step (b); and
  if there is no remaining non-leaf node in the execution plan tree, then generating the resulting execution plan in accordance with the execution plan tree in its current form.

12. The system of claim 11, further comprising an execution plan generator that associates the suggested execution plan to the query.

13. The system of claim 12, further comprising lookup tables through which the execution plan generator associates the suggested execution plan to the query.

14. The system of claim 11, wherein the suggested execution plan is encoded in extensible markup language showplan format.

15. The system of claim 11, wherein the suggested execution plan is generated by a previous query optimization.

16. The system of claim 11, wherein the suggested execution plan is generated by the previous query optimization and then subsequently edited.

* * * * *